United States Patent [19]
Mukai et al.

[11] Patent Number: 6,148,950
[45] Date of Patent: Nov. 21, 2000

[54] ELECTRIC POWER STEERING APPARATUS

[75] Inventors: Yoshinobu Mukai; Yoshiki Noro, both of Wako, Japan

[73] Assignee: Honda Giken Kogyo Kabushiki Kaisha, Tokyo, Japan

[21] Appl. No.: 09/137,484

[22] Filed: Aug. 20, 1998

[30] Foreign Application Priority Data

Aug. 27, 1997 [JP] Japan .................................... 9-231417

[51] Int. Cl.[7] .................................................. B62D 5/04
[52] U.S. Cl. ............................................. 180/446; 701/41
[58] Field of Search .................................. 180/446, 443, 180/444; 701/41, 42

[56] References Cited

U.S. PATENT DOCUMENTS

| | | | |
|---|---|---|---|
| 4,573,545 | 3/1986 | Kalns ....................................... | 180/79.1 |
| 4,896,735 | 1/1990 | Morishita et al. .................... | 364/424.05 |
| 4,959,787 | 9/1990 | Morishita et al. .................... | 364/424.05 |
| 5,198,981 | 3/1993 | Collier-Hallman et al. ........ | 364/424.05 |
| 5,299,650 | 4/1994 | Wada et al. ............................ | 180/79.1 |
| 5,504,679 | 4/1996 | Wada et al. ........................... | 364/424.05 |
| 5,563,790 | 10/1996 | Wada et al. .......................... | 364/424.05 |
| 5,568,389 | 10/1996 | McLaughlin et al. .............. | 364/424.05 |
| 5,668,721 | 9/1997 | Chandy ....................................... | 701/41 |
| 5,720,361 | 2/1998 | Nishimoto et al. ...................... | 180/446 |
| 5,743,351 | 4/1998 | McLaughlin et al. .................. | 180/446 |
| 5,762,160 | 6/1998 | Shimizu ................................... | 180/446 |
| 5,913,913 | 6/1999 | Okanoue ................................... | 701/41 |
| 5,999,869 | 12/1999 | Nishimoto et al. ....................... | 701/41 |

*Primary Examiner*—Kevin Hurley
*Assistant Examiner*—Andrew J. Fischer
*Attorney, Agent, or Firm*—Merchant & Gould P.C.

[57] ABSTRACT

An electric power steering apparatus comprises a control unit which controls a motor drive for driving an electric motor on the basis of an steering torque signal. The control unit has an assist inhibitor for inhibiting the feed of an assist torque by the motor to a steering system under given conditions. The assist inhibitor inhibits the generation of the assist torque by the motor when the direction of a manual steering torque and the direction of the assit torque are inconsistent for more than a predetermined time period. As a result, it becomes possible to exhibit desired damper effect during the predetermined time period and to inhibit the feed of the assist torque by the motor to the steering system after lapsing of the predetermined time period.

1 Claim, 7 Drawing Sheets

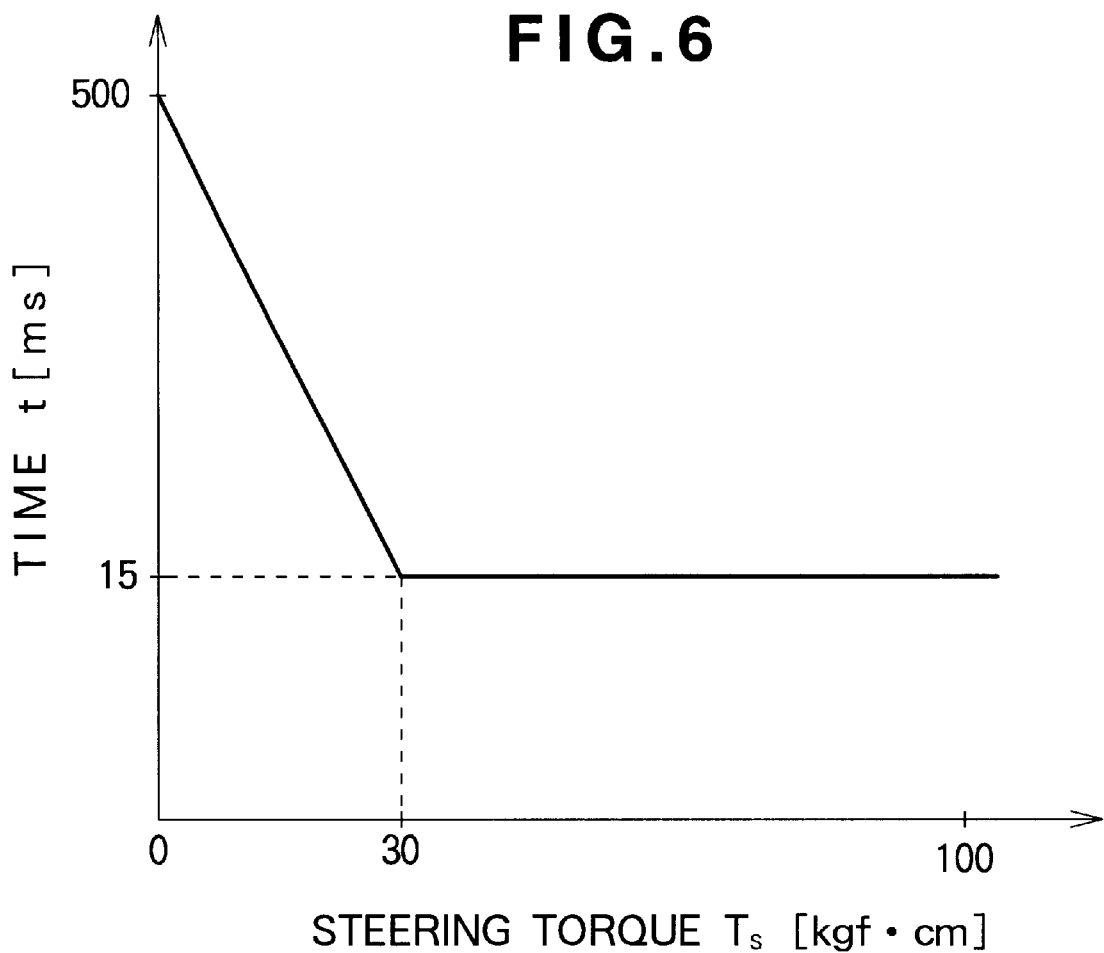

ELECTRIC POWER STEERING APPARATUS

BACKGROUND OF THE INVENTION

1. Field of the Invention

The present invention relates to an electric power steering apparatus for lightening the steering force of a driver by applying the drive force of an electric motor directly to a steering system.

2. Description of the Related Art

One known electric power steering apparatus employs a differential transformer as a steering torque sensor. In this electric power steering apparatus, a clockwise or counter-clockwise steering torque generated by turning a steering wheel is detected as an electric differential output generated in the differential transformer. The magnitude of the steering torque is detected in the form of an absolute value of the differential output while the direction of the steering torque is detected in polarity (+) of the differential output.

Another known electric power steering apparatus employs an operational amplifier as a steering torque detector, which amplifier is driven by a single power supply of 5 V. The operational amplifier is set to have a virtual ground point of 2.5 V so that a differential output of 0 in the differential transformer (steering torque being 0) is detected as a detection output of 2.5 V, the differential output of negative polarity (steering torque being in counter-clockwise direction) is detected as 0 to 2.5 V, and the differential output of positive polarity (steering torque being in clockwise direction) is detected as 2.5 V to 5.0 V.

In the steering torque detector, the state in which no steering torque is applied to the steering wheel (steering torque being 0) is set as a neutral point and the output of 2.5 V of the operational amplifier, corresponding to the neutral point, is set as a center value.

Still another known electric power steering apparatus is provided with a direction inhibitor for inhibiting, on the basis of a steering torque signal, the feed of a motor control signal to a motor drive to thereby determine whether or not a direction signal of the motor control signal, outputted from a control system for controlling the drive of the electric motor, and a direction signal outputted from the direction inhibitor are consistent. In the case of inconsistency, the assist by the electric motor, as opposed to the steering direction, is inhibited.

The direction inhibitor is set with two action reference values corresponding to the detected outputs of the steering torque detector in the clockwise and counter-clockwise directions. When the detected output in the clockwise direction exceeds the action reference value in the counter-clockwise direction, the electric motor assist in the counter-clockwise direction is inhibited. When the detected output in the counter-clockwise direction exceeds the action reference value in the clockwise direction, the electric motor assist in the clockwise direction is inhibited. With this construction, the electric motor assist is inhibited in response to a motor control signal outputted from a control system, when a CPU (or microprocessor) constructing the control system is troubled, for example, to invite the inconsistency between the direction signal, as detected by the direction inhibitor, and the direction signal of the motor control signal, as outputted from the control system.

As a result, an unnatural behavior of the vehicle is prevented by inhibiting such an electric motor assist against the will of the driver that the electric motor will assist in the counter-clockwise direction although the driver is turning the steering wheel in a clockwise direction.

In the conventional electric power steering apparatus, however, the assist time period by the electric motor for a torque value less than a predetermined value (e.g., 30 kgf·cm) is shortened where the steering force is set heavily in a high vehicle speed range. As a result, when achieving a steering damper effect by making an assist in the direction opposed to the torque direction, there arises a problem such that a reduced level of damper effect is produced, because the motor output is inhibited by a direction discriminator of the control system when the steering torque is at a predetermined or higher value and when the motor output direction and the torque value direction are different.

SUMMARY OF THE INVENTION

According to a first aspect of the present invention, there is provided an electric power steering apparatus which comprises an electric motor for applying an assist torque to a steering system, a steering torque detecting sensor for detecting the magnitude and direction of a manual steering torque acted upon the steering system, a control unit for outputting a motor control signal for controlling the electric motor on the basis of a signal fed from the steering torque detecting sensor, the control unit having an assist inhibitor for inhibiting the drive of the electric motor when the output of the steering torque detecting sensor and the direction of the assist torque of the electric motor are different for a predetermined or longer time period, and a motor drive for driving the electric motor on the basis of the motor control signal of the control unit.

One specific example of the assist inhibitor includes a torque direction determining section for determining the consistency/inconsistency between the direction of the manual steering torque detected by the steering torque detecting sensor and the direction of the assist torque by the electric motor, a timer for timing the duration of the inconsistency determination output from the torque direction determining section, and a time comparator for comparing the inconsistency duration fed from the timer with a predetermined time period.

Another specific example of the assist inhibitor includes a torque direction determining section for determining the consistency/inconsistency between the direction of the manual steering torque detected by the steering torque detecting sensor and the direction of the assist torque by the electric motor, a timer for timing the duration of the inconsistency determination output from the torque direction determining section, a predetermined time setting section for setting a predetermined time period in accordance with the output from the steering torque detecting sensor, and a time comparator for comparing the inconsistency duration fed from the timer with the predetermined time period.

By virtue of the assist inhibitor, it becomes possible to inhibit the feed of the assist torque by the electric motor to the steering system when the duration of inconsistency between the direction of the manual steering torque and the direction of the assist torque is equal to or longer than a predetermined time period, thereby achieving the damper effect at least for the predetermined time period. After lapse of this time period, the feed of the assist torque by the electric motor to the steering system can be inhibited reliably.

Further, in the electric power steering apparatus, when the duration of inconsistency between the manual torque direction and the assist torque direction is shorter than the predetermined time period, the assist torque of the electric motor to the steering system is not inhibited, thereby achieving continued control and damper effect upon repeated steering operations.

Moreover, in the electric power steering apparatus, the predetermined time setting section for setting the predetermined time period in accordance with the output from the steering torque detecting sensor is provided to make it possible to set the time period till the interruption of the output of the electric motor in accordance with the output from the steering torque detecting sensor. As a result, it becomes possible to set the time period in conformity with the characteristics of the electric motor, the vehicle weight and the transient characteristics of the vehicle.

According to a second aspect of the invention, there is provided an electric power steering apparatus which comprises an electric motor for applying an assist torque to a steering system, a steering torque detecting sensor for detecting the magnitude and direction of a manual steering torque acted upon the steering system, a control unit for outputting a motor control signal for controlling the electric motor on the basis of a signal fed from the steering torque detecting sensor, the control unit having an assist inhibitor for inhibiting the drive of the electric motor when the magnitude of the output from the steering torque detecting sensor is equal to or larger than a predetermined torque value and when the output of the steering torque detecting sensor and the direction of the assist torque of the electric motor are different for a predetermined or longer time period, and a motor drive for driving the electric motor on the basis of the motor control signal of the control unit.

It is desirable that the assist inhibitor includes a torque direction determining section for determining the consistency/inconsistency between the direction of the manual steering torque detected by the steering torque detecting sensor and the direction of the assist torque by the electric motor, a timer for timing the duration of inconsistency determination output from the torque direction determining section, a time comparator for comparing the inconsistency duration from the timer with a predetermined time period, a torque comparator for comparing the magnitude of the manual steering torque detected by the steering torque detecting sensor with a predetermined torque value, and an AND operator for making an AND operation between the output of the timer and the output of the torque comparator.

In the second aspect of the present invention, the drive of the electric motor can be inhibited when the magnitude of the output of the steering torque detecting sensor is equal to or larger than the predetermined torque value and when the output from the steering torque detecting sensor and the direction of the assist torque by the electric motor are different for the predetermined or longer time period, whereby a sufficient damper effect can be achieved when the steering torque is low as in the returning state of the steering system. Further, when the magnitude of the output of the steering torque detecting sensor is equal to or larger than the predetermined torque value and when the duration of inconsistency between the direction of the manual steering torque and the direction of the assist torque is shorter than the predetermined time period, the assist torque of the electric motor to the steering system is not inhibited. As a result, even when the steering force is set heavy in the high vehicle speed range, the assist, as opposed to the manual steering torque direction, can be performed to produce the steering damper effect.

BRIEF DESCRIPTION OF THE DRAWINGS

Preferred embodiments of the present invention will be explained in detail below, by way of example only, with reference to the accompanying drawings, in which:

FIG. 6 is a graph illustrating the characteristics of a predetermined time setting section shown in FIG. 4.

DETAILED DESCRIPTION OF THE PREFERRED EMBODIMENTS

The following description is merely exemplary in nature and is in no way intended to limit the invention or its application or uses.

Figure 1:
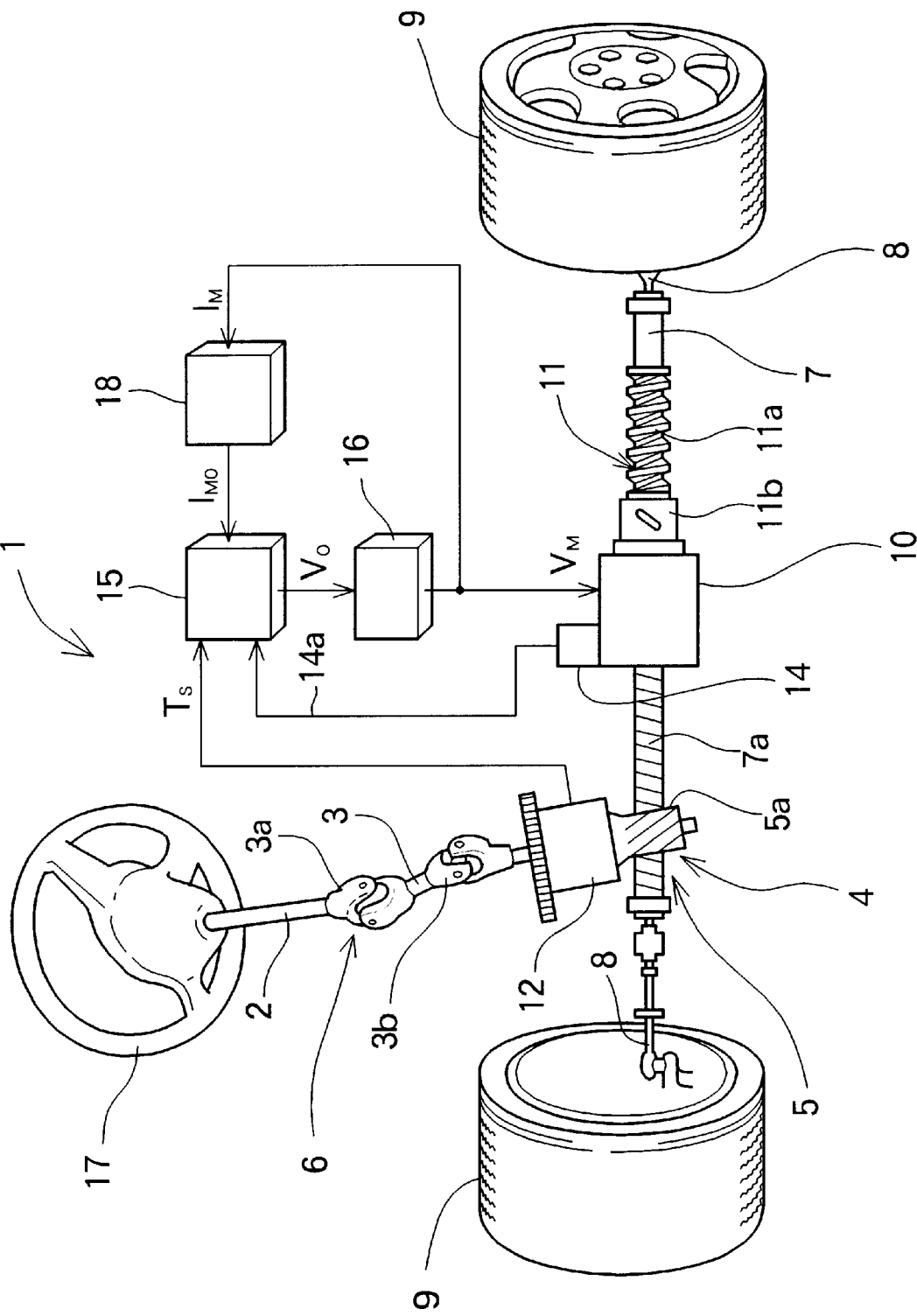
FIG. 1 is a schematic view showing the overall arrangement of an electric power steering apparatus according to the present invention.

As shown in FIG. 1, an electric power steering apparatus 1 has an electric motor 10 provided in a steering system and uses a control unit 15 for controlling the power fed from the electric motor 10, thereby to lighten the steering force of a driver.

A steering shaft 2 is connected at one end to a steering wheel 17 and at an opposite end to a pinion 5a of a rack-and-pinion mechanism 5 through a connecting shaft 3 having universal joints 3a and 3b. The electric power steering apparatus is equipped with a manual steering force generating mechanism 6 which includes the steering wheel 17, the steering shaft 2, the connecting shaft 3 and the rack-and-pinion mechanism 5.

A rack shaft 7 has rack teeth 7a meshing with the pinion 5a so that it can be reciprocated by the meshing engagement. The rack shaft 7 is connected at its two ends through tie rods 8 and 8 to right and left front wheels 9 and 9 serving as steered wheels.

The electric motor 10 for lightening the steering force in he steering system is disposed coaxially with the rack shaft 7. Its rotational force is converted into a thrusting force via a ball screw mechanism 11 provided coaxially with the rack shaft 7, which thrusting force is applied to the rack shaft 7 (or a ball screw shaft 11a).

In a steering gearbox 4, there is disposed a steering torque sensor 12 for detecting the direction and magnitude of a steering torque arising when the steering wheel 17 is turned. A steering torque signal Ts corresponding to the steering torque detected by the steering torque sensor 12 is fed to the control unit 15.

A motor rotation speed sensor 14 detects the rotation speed and the direction of rotation of the electric motor 10 and feeds a motor speed signal 14a, made of pulse signals corresponding to the rotation speed and direction, to the control unit 15.

The control unit 15 is made basically of a microprocessor and equipped with various calculation and processing units, control signal generators, memories and so on. The control unit 15 generates a motor control signal Vo (e.g., a composite signal of ON and PWM signals) corresponding to the steering torque signal Ts and feeds it to a motor drive 16. Further, the control unit 15 inhibits the feed of an assist torque from the electric motor 10 to the steering system when the duration of inconsistency between the direction of the steering torque and the direction of the assist torque is a predetermined time period or longer. Moreover, the control unit 15 inhibits the drive of the electric motor when the magnitude of the output from the steering torque detecting sensor is a predetermined torque value or higher and when the directions of the output of the steering torque detecting sensor and the assist torque by the electric motor are different for a predetermined time period or longer.

The motor drive 16 is constructed of a bridge circuit composed of four switching elements such as power FETs (Field Effect Transistors) and PWM-drives respective pair of power FETs positioned diagonally of the bridge circuit on the basis of the motor control signal Vo for outputting a motor voltage VM thereby to drive the electric motor 10.

A motor current detector 18 detects a motor current IM actually flowing through the electric motor 10, thereby to feed a motor current signal IMO corresponding to the motor current IM back to the control unit 15.

Figure 2:
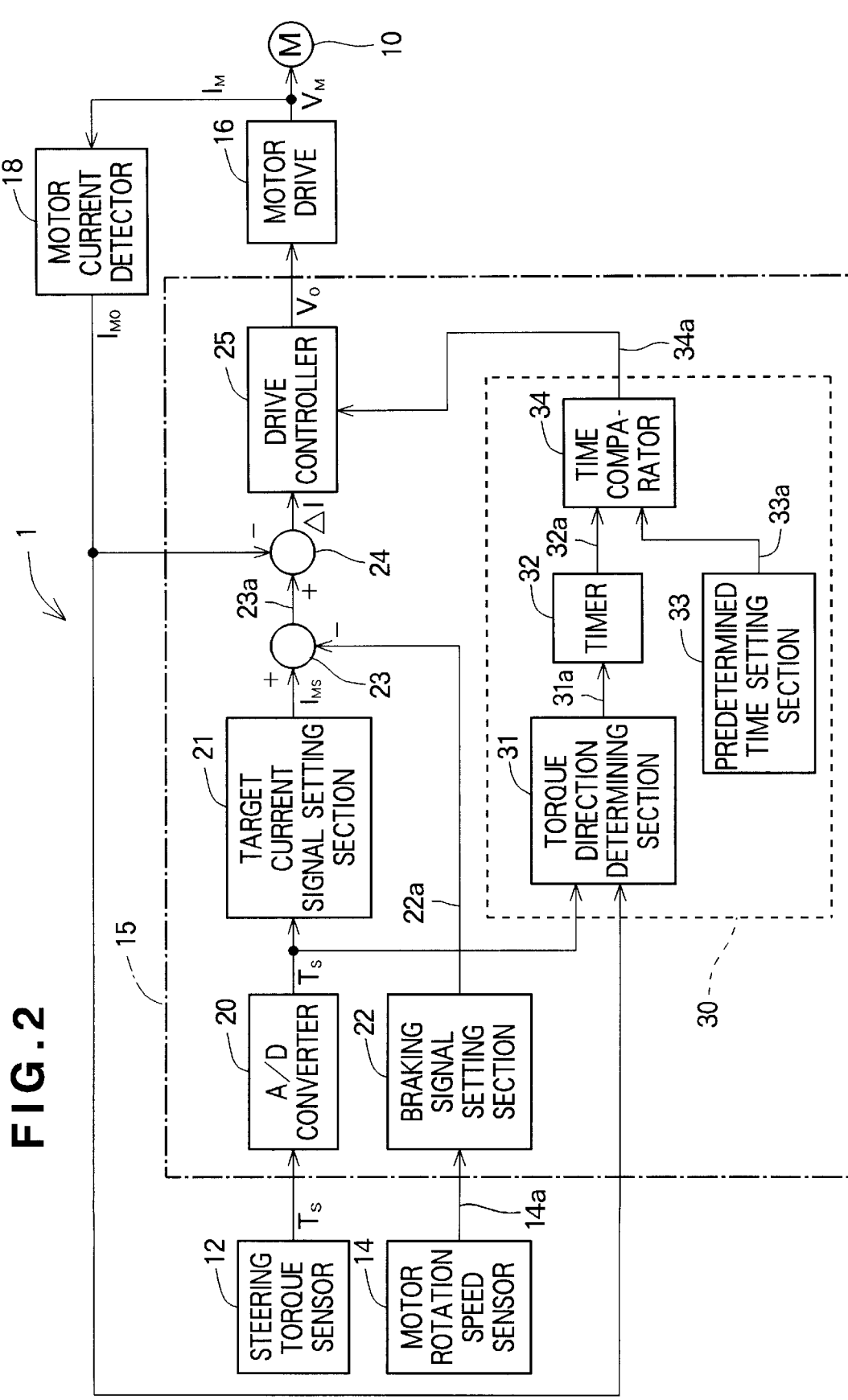
FIG. 2 is a block diagram illustrating the electric power steering apparatus of FIG. 1.

FIG. 2 shows, in block diagram, the electric power steering apparatus 1 according to the first embodiment shown in FIG. 1.

As shown in FIG. 2, the electric power steering apparatus 1 is equipped with the electric motor 10, the steering torque sensor 12, the motor rotation speed sensor 14, the control unit 15, the motor drive 16 and the motor current detector 18.

The control unit 15 includes an A/D converter 20, a target current signal setting section 21, a braking signal setting section 22, a subtracter 23, a deviation calculator 24, a drive controller 25 and an assist inhibitor 30.

The A/D converter 20 feeds the steering torque signal Ts, as digitally converted from the analog steering torque signal Ts, to the target current signal setting section 21 and the assist inhibitor 30.

The target current signal setting section 21 is formed of a memory which comprises a ROM. The target current signal setting section 21 stores data corresponding to the steering torque signal Ts, obtained from advance experiments or through designing, and a target current signal IMS, so that the target current signal IMS corresponding to the steering torque signal Ts as an address is read out and fed to the subtracter 23.

The braking signal setting section 22 stores braking data, corresponding to the motor rotation speed signal 14*a*, in the ROM so as to exhibit the damping effect, and feeds the subtracter 23 with a braking signal 22*a* obtained by reading the braking data using the motor rotation speed signal 14*a* as an address.

The subtracter 23 has a software-controlled subtracting function. This subtracter 23 makes a subtraction between the target current signal IMS, fed from the target current signal setting section 21, and the control signal 22*a*, fed from the braking signal setting section 22, for feeding a resulting differential signal 23*a* (=IMS−22*a*) to the deviation calculator 24.

The deviation calculator 24 outputs a deviation signal $\Delta I$ (=23*a*−IMO), obtained by performing subtraction between the differential signal 23*a* and the motor current IMO, to the drive controller 25.

The drive controller 25 includes a PID controller, a PWM signal generator, a logic circuit and so on. The drive controller 25 generates a PWM signal VPWM, an ON signal Von and an OFF signal Voff (as shown in FIG. 7) corresponding to the magnitude and polarity of the deviation signal $\Delta I$, by giving a PID (proportional, integral and differential) control to the deviation signal $\Delta I$ fed from the deviation calculator 24, and outputs a resulting motor control signal Vo to the motor drive 16.

The drive controller 25 feeds the PWM signal VPWM, the ON signal Von and the OFF signal Voff to the logic circuit and executes the control for outputting and inhibiting the output of the motor control signal Vo on the basis of the logic level of an assist inhibiting signal 34*a* fed from the assist inhibitor 30 to be described in detail below.

The assist inhibitor 30 includes a torque direction determining section 31, a timer 32, a predetermined time setting section 33 and a time comparator 34.

The torque direction determining section 31 determines the consistency/inconsistency between the direction of the steering torque signal Ts from the steering torque sensor 12 and the direction of the motor current signal IMO from the motor current detector 18, and feeds the timer 32 with a direction determination signal 31*a* which takes a logic level "0" when coincident and a logic level "1" when inconsistent. It should be noted that the direction of the motor current signal IMO and the direction of the assist torque of the electric motor are in consistency at all times.

The timer 32 feeds the time comparator 34 with a timed signal 32*a* which is obtained by timing the duration of the logic level "1" (inconsistency) of the direction determination signal 31*a*.

The predetermined time setting section 33 feeds the time comparator 34 with a predetermined time signal 33*a* which is obtained by setting a predetermined time period (e.g., 15 msecs.).

The time comparator 34 compares the timed signal 32*a* and the predetermined time signal 33*a* and feeds a time comparison signal 34*a* of logic level "1", for example, as a drive control inhibit signal to the drive controller 25 when the timed signal 32*a* is no less than the predetermined time signal 33*a* (i.e., 32*a*$\geq$33*a*), to inhibit the output of the motor control signal Vo from the drive controller 25. Then, the motor drive 16 interrupts the drive of the electric motor 10 to reduce the assist torque to the steering system by the electric motor 10, to zero.

As explained above, the control unit 15 of the electric power steering apparatus 1 according to the present invention includes the target current signal setting section 21, the subtracter 23, the deviation calculator 24, the drive controller 25 and the assist inhibitor 30. As a result, the assist torque applied to the steering system by the electric motor 10 can be reduced to zero when the direction of the assist torque applied to the steering system by the electric motor 10 and the direction of the manual steering torque actin on the steering system are different for the predetermined time period (e.g., 15 msecs.).

Figure 3:
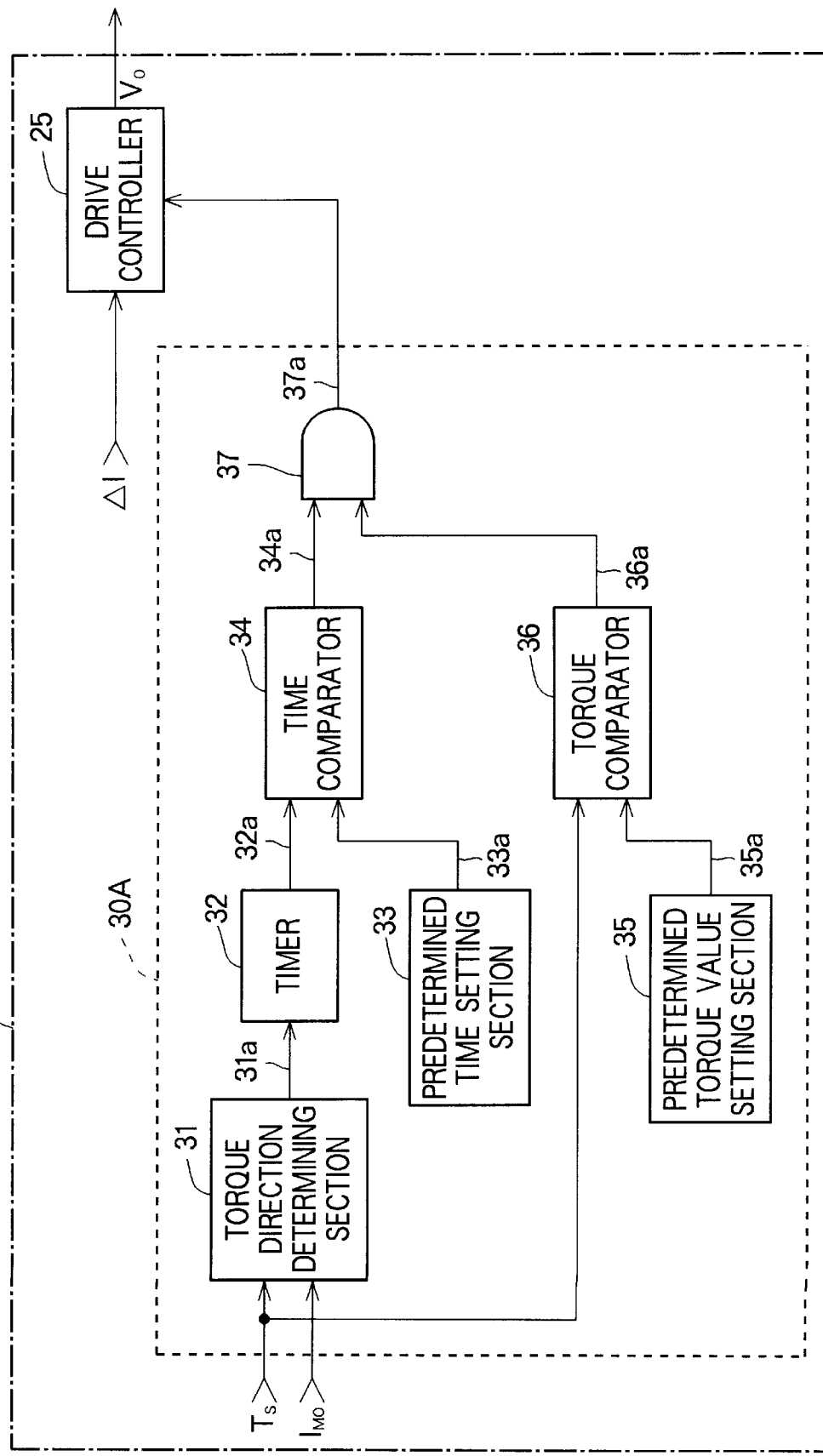
FIG. 3 is a block diagram showing a characteristic part of a control unit according to a second embodiment, of the electric power steering apparatus shown in FIG. 2.

FIG. 3 is a block diagram showing a relevant portion of a control unit of an electric power steering apparatus according to a second embodiment of the present invention.

The electric power steering apparatus 1A shown in FIG. 3 is constructed identically to the electric power steering apparatus 1 shown in FIG. 2, excepting an assist inhibitor 30A of the control unit 15A. Thus, the assist inhibitor 30A of the control unit 15A is shown in FIG. 3 with the remaining identical construction being omitted.

As shown in FIG. 3, the assist inhibitor 30A of the control unit 15A includes the torque direction determining section 31, the timer 32, the predetermined time setting section 33, the time comparator 34, a predetermined torque value setting section 35, a torque comparator 36 and an AND operator 37.

The same reference numerals will be used for the same components of the assist inhibitor 30A as those of the assist inhibitor 30 shown in FIG. 2 and their description will be omitted.

The torque comparator 36 compares the magnitude of the steering torque signal Ts from the steering torque sensor 12 with the predetermined torque signal 35a obtained by setting a predetermined torque value (e.g., 30 Kgf·cm) in the predetermined torque value setting section 35, and feeds the resulted torque comparison signal 36a of logic level "1" when the steering torque signal Ts≧ the predetermined torque signal 35a.

The AND operator 37 feeds to the drive controller 25 an AND output signal 37a as the assist inhibit signal, which is obtained by performing an AND operation between the time comparison signal 34a from the time comparator 34 and the torque comparison signal 36a.

As described above, the control unit 15A of the electric power steering apparatus 1A according to the second embodiment is equipped with the assist inhibitor 30A having the torque direction determining section 31, the timer 32, the predetermined time setting section 33, the time comparator 34, the predetermined torque value setting section 35, the time comparator 36 and the AND operator 37. With this arrangement, the assist torque to the steering system by the electric motor can be inhibited when the magnitude of the manual steering torque is at the predetermined torque (e.g., 30 Kgf·cm) or higher and when the inconsistency between the direction of the manual steering torque and the direction of the assist torque continues for the predetermined time period (e.g., 15 msecs.) or longer.

Figure 4:
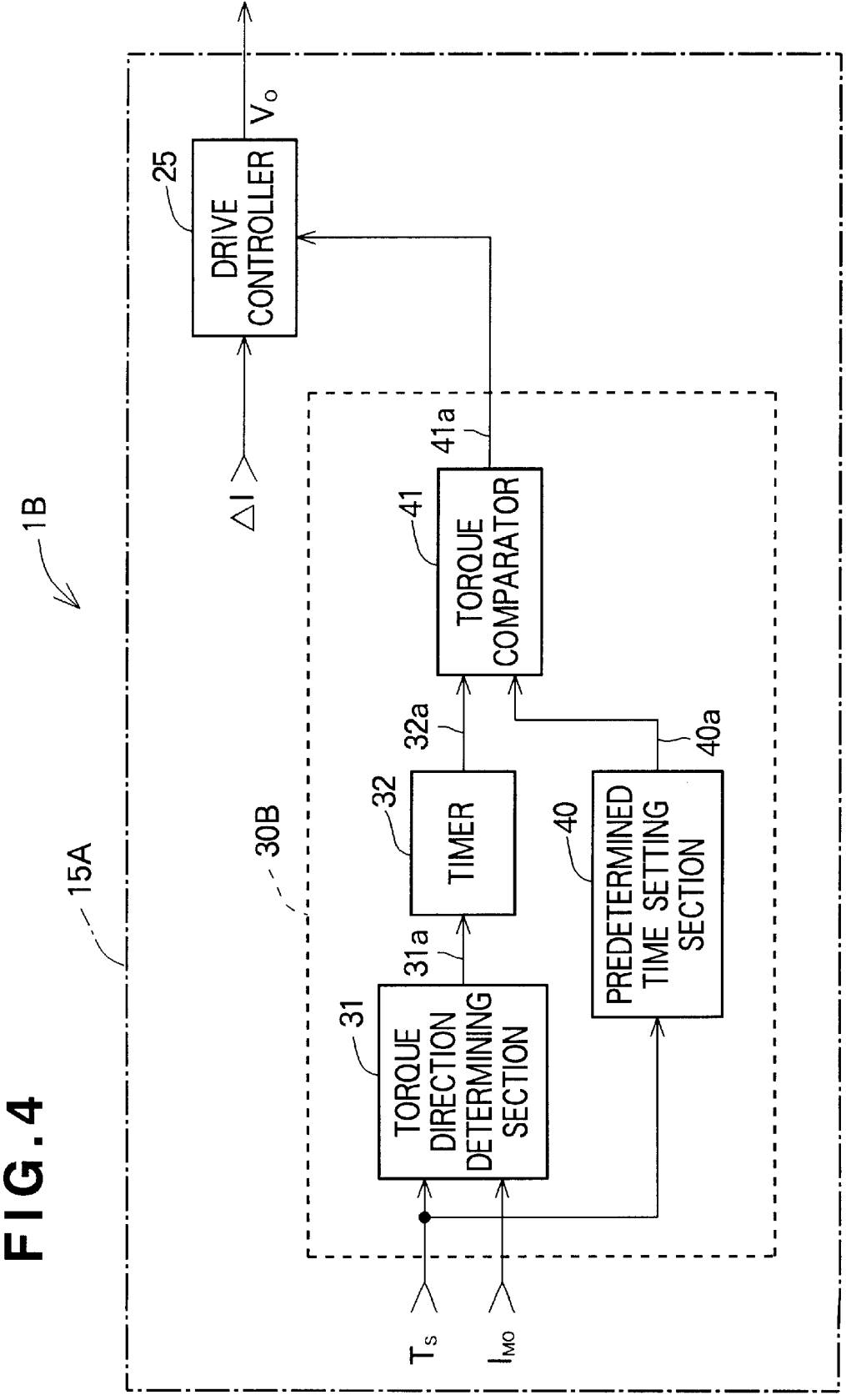
FIG. 4 is a block diagram showing a characteristic part of a control unit according to a third embodiment, of the electric power steering apparatus.

FIG. 4 is a block diagram showing a characteristic part of a control unit of an electric power steering apparatus according to a third embodiment.

The electric power steering apparatus 1B according to the third embodiment is constructed identically to that of the electric power steering apparatus 1 shown in FIG. 2, excepting an assist inhibitor 30B of a control unit 15B, and hence the assist inhibitor 30B of the control unit 15B is shown in FIG. 4 with the remaining identical construction being omitted.

As shown in FIG. 4, the assist inhibitor 30B of the control unit 15B includes the torque direction determining section 31, the timer 32, a predetermined time setting section 40, and a time comparator 41.

The same components of the assist inhibitor 30B as those of the assist inhibitor 30 shown in FIG. 2 will be omitted, designating the components by the same or like reference numerals.

The predetermined time setting section 40 stores, in a memory such as a ROM, time data corresponding to the steering torque signal Ts fed from the A/D converter 20 (shown in FIG. 2), and feeds the time comparator 41 with a predetermined time signal 40a obtained by reading the time data addressed at the steering torque signal Ts.

FIG. 6 illustrates characteristics of the predetermined time signal 40a of the predetermined time setting section 40 against the steering torque signal TS of the steering torque sensor 12 with the steering torque TS (kgf·cm) taken on the abscissa and the time t (msecs) on the ordinate.

The predetermined time signal 40a decreases generally linearly to 500 to 15 (ms) against the steering torque signal Ts of 0 to 30 (kgf·cm) or less and takes a constant value of 15 (ms) against the steering torque signal Ts of 30 (kgf·cm) or more.

The time comparator 41 shown in FIG. 4 compares the timed signal 32a with the predetermined time signal 40a and outputs a time comparison signal 41a of, for example, logic level "1", as the drive control inhibit signal to the drive controller 25 when the timed signal 32a is no less than the predetermined time signal 40a (32a≧40a) so as to interrupt the action of the drive controller 25 thereby to reduce to zero the assist torque fed to the steering system by the electric motor 10.

As discussed above, the electric power steering apparatus 1B according to the third embodiment is equipped in its control unit 15B with the assist inhibitor 30B having the torque direction determining section 31, the timer 32, the predetermined time setting section 40 and the time comparator 41. With this arrangement, when the duration of inconsistency between the direction of the manual steering torque and the direction of the assist torque is longer than the predetermined time period which is variable with the magnitude of the manual steering torque, the assist torque to the steering system by the electric motor can be inhibited. It also enables time setting in conformity with the characteristics of the electric motor, the vehicle weight and the transient characteristics of the vehicle.

Figure 5:
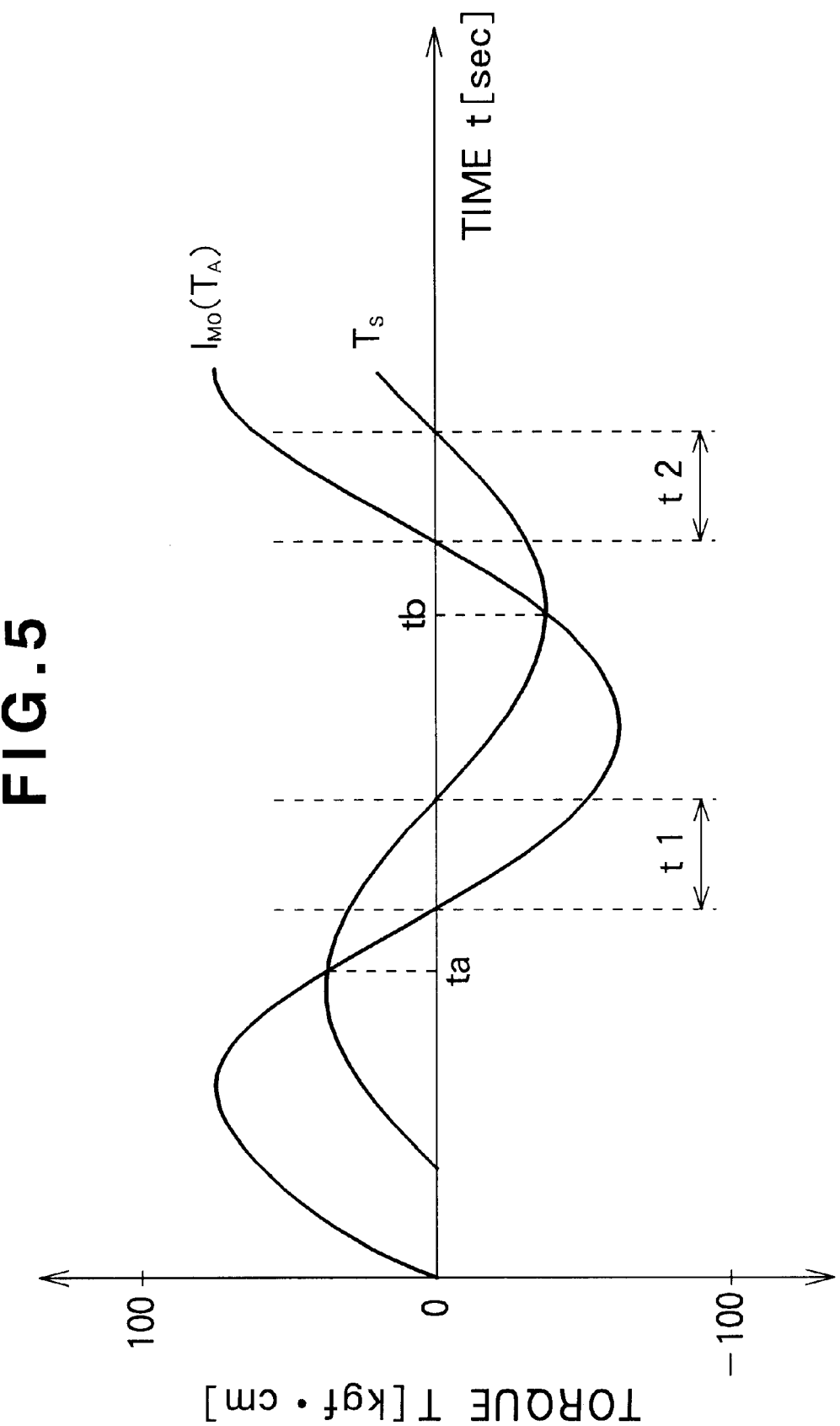
FIG. 5 is a graph illustrating the action of a torque direction determining section forming an assist inhibitor of the control unit.

FIG. 5 is an action diagram of the torque direction determining section 31 and illustrates the waveforms of the steering torque signal Ts of the steering torque sensor 12 and the motor current signal IMO of the motor current detector 18 with the time t (sec) taken on the abscissa and the torque T (kgf·cm) on the ordinate.

At and after times ta and tb, when the steering torque signal Ts and the motor current signal IMO intersect, there are time bands (t1 and t2) where the polarity (or direction) of the steering torque signal Ts and the polarity (or direction) of the motor current signal IMO as an assist torque signal TA are different.

In the prior art, the assist torque by the electric motor is inhibited when the steering torque Ts is no less than the predetermined value for the time bands (t1 and t2) with the result that sufficient damper effect is not exhibited and the continuity of the assist torque is lost, thereby deteriorating a steering feel.

In contrast, in the present invention, the assist torque by the electric motor is continued for a predetermined time period even within the time bands (t1 and t2) so that the damper effect is sufficiently exhibited. If the predetermined time period is made longer than, for example, t1 and t2, the continuity of the assist torque is retained.

The torque direction determining section 31 determines inconsistency between the polarity (or direction) of the steering torque signal Ts and the polarity (or direction) of the assist torque signal TA as the motor current signal IMO by the electric motor.

Figure 7A:
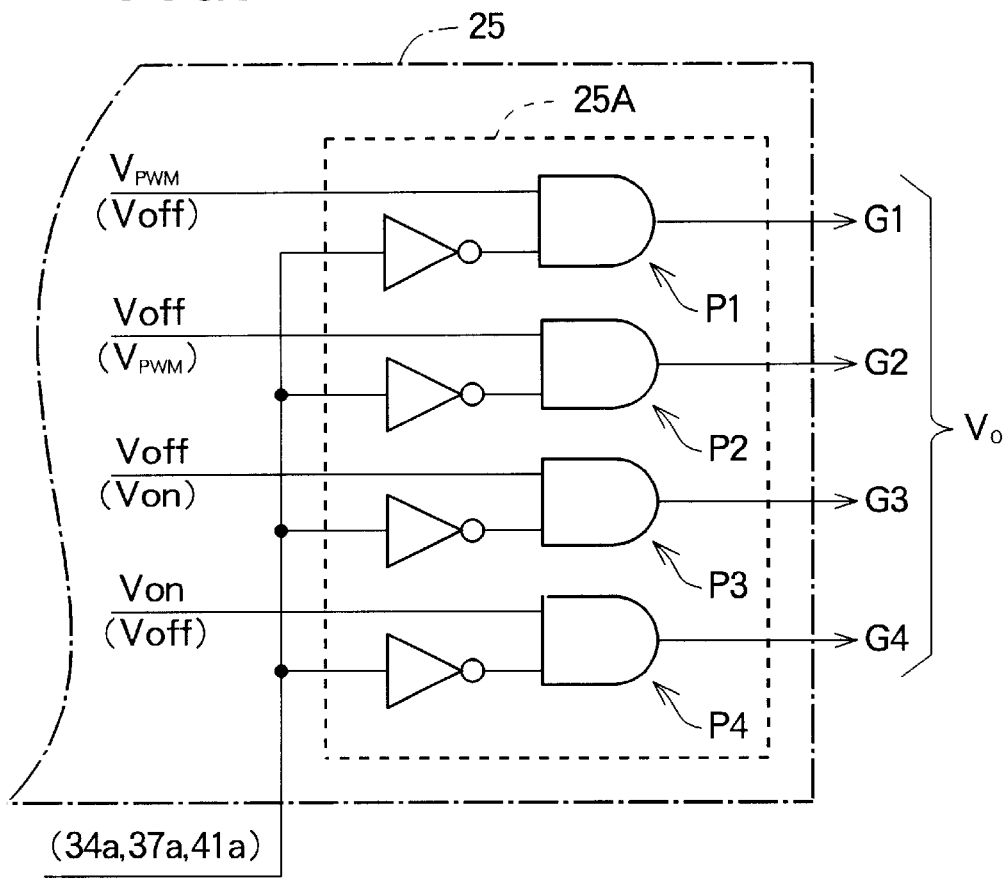
FIGS. 7A and 7B are circuit diagrams illustrating the logic circuit output of a drive controller and the action of a motor drive of the electric power steering apparatus.
Figure 7B:
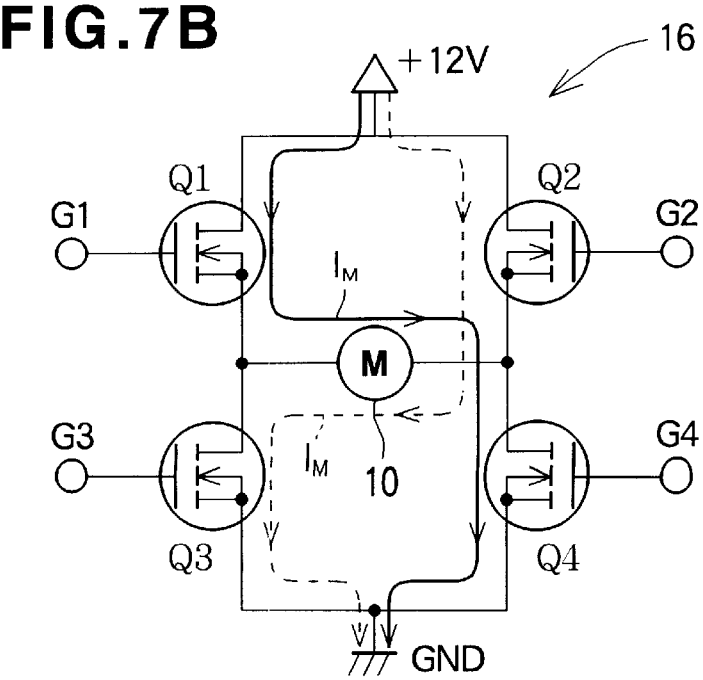

FIGS. 7A and 7B are diagrams for explaining the logic circuit outputs of the drive controller 25 and the actions of the motor drive 16. FIG. 7A is a logic circuit diagram of the drive controller 25, and FIG. 7B is a circuit diagram of the motor drive 16.

In FIG. 7A, a logic unit 25A of the drive controller 25 is equipped with logic circuits P1 to P4 having NOT gates and two-input AND gates.

Assume that the steering wheel 17 (as shown in FIG. 1) is turned clockwise. The PWM signal VPWM, the OFF signal Voff, the OFF signal Voff and the ON signal Von are inputted to the one-end input terminals of the individual AND gates of the logic circuits P1 to P4. When the assist inhibit signals 34a, 37a and 41a fed from the assist inhibitors 30, 30A and 30B (as shown in FIGS. 2, 3 and 4) are at the logic level "0", the logic level "1" is inputted to the other input terminals of the individual AND gates through the NOT gates. As a result, the PWM signal Vpwm, the OF signal Voff, the OFF signal Voff and the ON signal Von inputted to the one-end input terminals of the individual AND gates are outputted under the AND conditions from the logic circuits P1 to P4. Moreover, the motor control signal Vo is fed to the gates G1 to G4 of power FETs (Field Effect Transistors) Q1 to Q4 forming the motor drive 16, as shown in FIG. 7B.

In response to the signals fed to the gates G1 to G4: the transistor Q1 is PWM-driven; the transistors Q2 and Q3 are OFF-driven; and the transistor Q4 is ON-driven. Then, the motor current Im flows in the course of the power supply (at 12 V)→Q1→the electric motor 10→Q4→GND, so that the electric motor 10 rotates forward, for example, to aid the clockwise turn of the steering wheel 17.

Assume now that the steering wheel 17 is turned counter-clockwise. The OFF signal Voff, the PWM signal Vpwm, the ON signal Von and the OFF signal Voff are inputted to the one-end terminals of the individual AND gates of the logic circuits P1 to P4. When the assist inhibit signals (34a, 37a and 41a) fed from the assist inhibitors are at the logic level "0", the logic level "1" is inputted to the other input terminals of the individual AND gates through the NOT gates. As a result, the OFF signal Voff, the PWM signal Vpwm, the ON signal Von and the OFF signal Voff inputted to the one-end terminals of the AND gates are outputted under the AND condition from the logic circuits P1 to P4. Moreover, the motor control signal Vo is fed to the gates G1 to G4 of the FETs (Field Effect Transistors) Q1 to Q4 of the motor drive 16, as shown in FIG. 7B.

In response to the signals fed to the gates G1 to G4: the transistor Q1 is OFF-driven; the transistor Q2 is PWM-driven; the transistor Q3 is ON-driven; and the transistor Q4 is OFF-driven. Then, the motor current Im flows in the course of the power supply (at 12 V)→Q2→the electric motor 10→Q3→GND so that the electric motor 10 rotates backward to aid the counterclockwise turn of the steering wheel 17.

Discussion will now be made as to the case in which the microprocessor of the control system is troubled by some cause when the steering wheel 17 is turned clockwise.

The motor control signal Vo is outputted as if the OFF signal Voff, the PWM signal Vpwm, the ON signal Von and the OFF signal Voff were inputted by a trouble to the one-end input terminals of the individual AND gates of the logic circuits P1 to P4 so that the steering wheel 17 were turned counter-clockwise, although the PWM signal Vpwm, the OFF signal Voff, the OFF signal Voff and the ON signal Von are inputted, if normal, to the one-end input terminals of the individual AND gates of the logic circuits P1 to P4. Then, the assist inhibition signals (34a, 37a and 41a) of logic level "1" are fed from the assist inhibitors to the NOT gates so that the outputs of the logic circuits P1 to P4 are reduced to the logic level "0" to turn OFF the transistors Q1 to Q4 of the motor drive 16 thereby to inhibit the addition of the assist torque to the steering system by the electric motor 10.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus comprising;
    an electric motor applying an assist torque to a steering system;
    a steering torque detecting sensor detecting the magnitude and direction of a manual steering torque acted upon said steering system;
    a control unit outputting a motor control signal for controlling said electric motor on the basis of a signal fed from said steering torque detecting sensor, said control unit having an assist inhibitor inhibiting the drive of said electric motor when the output of said steering torque detecting sensor and the direction of the assist torque of said electric motor are different for a predetermined or longer time period; and
    a motor drive driving said electric motor on the basis of the motor control signal from said control unit;
    wherein said assist inhibitor includes a torque direction determining section determining the consistency/inconsistency between the direction of the manual steering torque detected by said steering torque detecting sensor and the direction of the assist torque by said electric motor;
    a timer timing the duration of the inconsistency determination output from said torque direction determining section;
    a predetermined time setting section setting a predetermined time period in accordance with the output from said steering torque detecting sensor; and
    a time comparator comparing the inconsistency duration from said timer with said predetermined time period.

* * * * *